(No Model.)
W. L. GERARD.
COLTER.
No. 351,631. Patented Oct. 26, 1886.
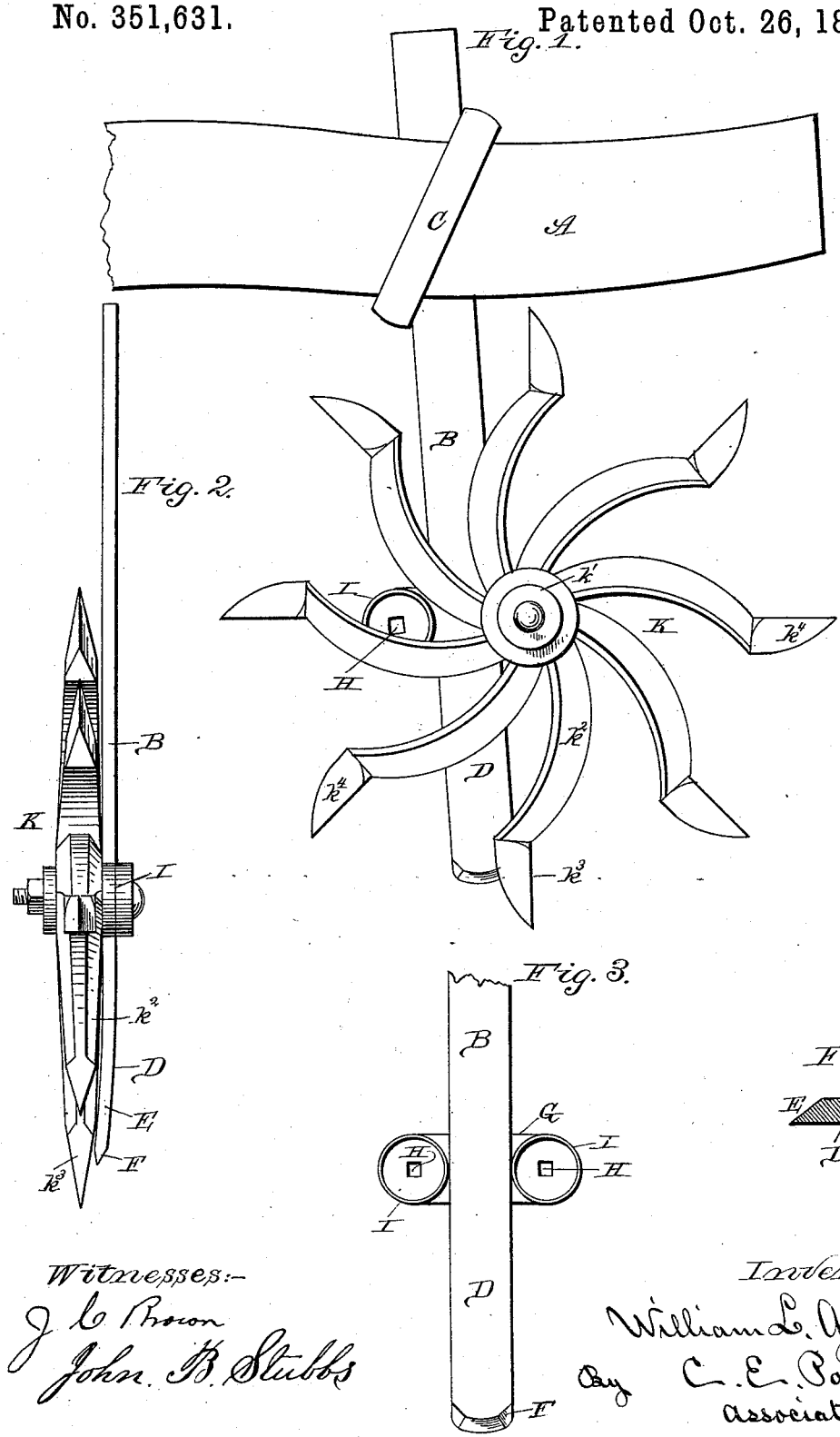

UNITED STATES PATENT OFFICE.

WILLIAM L. GERARD, OF EMPORIA, KANSAS.

COLTER.

SPECIFICATION forming part of Letters Patent No. 351,631, dated October 26, 1886.

Application filed December 28, 1885. Serial No. 186,958. (No model.)

*To all whom it may concern:*

Be it known that I, WILLIAM L. GERARD, a citizen of the United States, residing at Emporia, in the county of Lyon and State of Kansas, have invented certain new and useful Improvements in Colters for Plows; and I do hereby declare the following to be a full, clear, and exact description of the invention, such as will enable others skilled in the art to which it appertains to make and use the same.

My invention relates to an improvement in colters for plows; and it consists in the peculiar construction and combination of devices, that will be more fully set forth hereinafter, and particularly pointed out in the claims.

In the drawings, Figure 1 is an elevation of my improved colter attached to the beam of a plow. Fig. 2 is an edge view of the same. Fig. 3 is a detached view of the colter with the rotating-wheel removed. Fig. 4 is a transverse sectional view of the colter.

A represents the beam of a plow, to which is secured a colter, B, by means of a clip, C. This colter forms a straight bar or knife, the lower portion of which is slightly curved, as at D, and sharpened on its opposite edges, as at E. The lower end of the colter is beveled on both sides to a point, F.

G represents a bar, which extends transversely from the colter at a suitable distance from the lower end thereof and beyond the opposite cutting-edges of the colter, as shown. In the ends of the bar G are openings H, which form the centers for annular rims I, that project from the inner side of the ends of the bar.

K represents a rotating walking-wheel, the hub of which has reduced extensions $k$, that are adapted to enter either of the rims I. This wheel is secured to the front projecting arm of the bar G by a pivotal bolt, L, that passes through the said wheel and one of the openings H. The arms of the wheel are curved, as shown, and beveled on their front sides, as at $k^2$, and at the ends of the said arms are radial spurs $k^3$, which are sharpened to a point, are flat or plane on their front sides to enable them to catch firmly into the ground, and beveled on their rear sides to an edge, $k^4$, which offers but slight resistance to entering the ground as the wheel rotates. The sides of the arms of the wheel are slightly curved or rounded, as at $k^5$, to correspond to the curve of the lower end of the colter to enable the arms of the wheel to move closely past the plane side of the latter.

As the plow is drawn along, the wheel is rotated by reason of the spurs which enter the ground, and cornstalks and other rubbish are caught by the arms of the wheel and presented to the front cutting-edge of the colter and severed thereby.

By having the colter sharpened on opposite edges it is rendered reversible and adapted to be turned so as to present either edge as a cutting-edge, and is thus adapted to be used on either a right or left hand plow, and its efficiency thereby increased.

Having thus described my invention, I claim—

1. The combination of the colter having the sharpened edges and the cross-bar G, extending beyond the said edges, with the walking-wheel, whereby the colter is rendered reversible, and the walking-wheel adapted to be journaled to either end of the bar G, substantially as described.

2. The combination of the colter having the sharpened edges and the cross-bar G, extending beyond the said edges and having the openings H, and the annular projecting rims I at its outer ends, with the walking-wheel having the reduced extensions on its hub to fit into the rims I and the bolt to secure the wheel to the cross-bar, substantially as described.

3. In combination with the colter B and cross-bar G, the walking-wheel having the curved arms beveled on their front sides, and the radial spurs at the outer ends of the said arms, the said spurs being sharpened to a point and having each the plane front side and the beveled sharpened rear side, substantially as described.

In testimony whereof I have affixed my signature in presence of two witnesses.

WILLIAM L. GERARD.

Witnesses:
 ED. S. WATERBURY,
 WM. REES.